United States Patent [19]

Onoki

[11] Patent Number: 4,883,548

[45] Date of Patent: Nov. 28, 1989

[54] PROCESS FOR PRODUCING LAMINATED OPHTHALMIC LENS

[75] Inventor: Fumio Onoki, Tokorozawa, Japan

[73] Assignee: Hoya Corporation, Tokyo, Japan

[21] Appl. No.: 184,426

[22] Filed: Apr. 21, 1988

[30] Foreign Application Priority Data

Apr. 24, 1987 [JP] Japan .................................. 62-101486

[51] Int. Cl.⁴ ........................ B32B 31/12; B32B 17/06
[52] U.S. Cl. ...................................... 156/99; 264/1.7; 264/1.8; 264/1.9; 264/2.7; 350/320; 350/417; 351/163; 351/166; 351/172; 351/177; 428/426
[58] Field of Search .................... 156/99; 264/1.7–1.9, 264/2.7; 350/320, 417; 351/159, 163, 166, 168, 172, 177; 428/426

[56] References Cited

U.S. PATENT DOCUMENTS

| | | | |
|---|---|---|---|
| 3,617,116 | 11/1971 | Jones | 351/177 |
| 3,940,304 | 2/1976 | Schuler | 351/177 X |
| 3,998,531 | 12/1976 | Marzouk | 351/166 |
| 4,577,942 | 3/1986 | Frieder et al. | 351/172 X |
| 4,645,317 | 2/1987 | Frieder et al. | 351/177 X |

Primary Examiner—Robert A. Dawson
Attorney, Agent, or Firm—Nixon & Vanderhye

[57] ABSTRACT

According to the present invention, a plurality of first lens elements each having specific lens optical values and a plurality of second lens elements each having specific lens optical values are kept in stock; each one of the first and second lens elements are selected from those kept in stock, based on optical calculation; and these two lens elements are laminated to form an opthalmic lens meeting a desired prescription. Accordingly, the present invention has advantages such as shortening of the period from order receiving to product delivery.

3 Claims, 2 Drawing Sheets

PROCESS FOR PRODUCING LAMINATED OPHTHALMIC LENS

BACKGROUND OF THE INVENTION

1. Field of the Invention

The present invention relates to a process for producing an ophthalmic lens and more particularly to a process for producing an ophthalmic lens which is a laminate of two lens element.

2. Description of Prior Art

Ophthalmic leses have conventionally been produced by, once a lens prescription is determined, subjecting a semi-finished lens kept in stock to rough grinding, smoothing and polishing so as to meet the prescription. The lens is then typically subjected to surface treatments for the purposes of tinging, surface hardening, reflection prevention, etc.

In this process, however, a final ophthalmic lens product is obtained by, after the determination of a prescription, subjecting a semi-finished lens to a plurality of steps mentioned above, thus requiring a long time from customer's order to the delivery of the final product to the customer.

Further in the above process, since the semi-finished lenses are stored without being subjected to surface treatments until they are processed into a final ophthalmic lens product, the semi-finished lenses may be prone, during storage, to deterioration by surface oxidation when they are made of a glass and deterioration by moisture when they are made of a plastic. Such semi-finished lenses, when deteriorated in properties, are unable to satisfactorily form intended films thereon when subjected to surface treatments for the purposes of tinting, surface hardening, reflection prevention, etc.

Furthermore in the above process, a final ophthalmic lens product can be produced only at factories having equipment necessary for ophthalmic lens production.

As a measure for solving the above problems, there have been kept in stock a great variety of final ophthalmic lens products, by lens material (glass, plastic), by lens focus (single vision, bifocal, trifocal, progressive), by lens application (farsighted, nearsighted, astigmatic), and by lens function (tinging, surface protection, reflection prevention, photochromism, anti-fogging), whereby diversified customer needs have been met. This approach makes the stock control of ophthalmic lenses extremely complex.

Hence, an object of the present invention is to provide a process for producing an ophthalmic lens in a short period of time from receipt of a lens order to product delivery, as compared with the conventional process for producing an ophthalmic lens by subjecting a semi-finished lens to a plurality of steps after an order is received.

Another object of the present invention is to provide a process for producing an ophthalmic lens, wherein surface-treatment layers of lens such as a tinted layer, a protective film layer, an anti-reflection film layer and the like can be formed easily and precisely, unlike the conventional process for producing an ophthalmic lens wherein these surface-treatment layers of lens cannot be formed satisfactorily because a semi-finished lens without surface treatment is kept in stock until an order is received. Accordingly, such a lens may experience property deterioration during storage.

Still another object of the present invention is to provide a process for producing an ophthalmic lens wherein a great variety of ophthalmic lenses can be obtained by simply laminating two lens elements selected from two groups of lens elements kept in stock, as compared with the conventional process of keeping in stock a great variety of finished ophthalmic lens products.

Other objects of the present invention will become apparent from the following descriptions and drawings.

SUMMARY OF THE INVENTION

The above objects of the present invention have been achieved by a process for producing an ophthalmic lens which is a laminate of a first lens element and a second lens element, which process comprises steps of:

(I) providing a plurality of first lens elements each having specific lens optical values and a plurality of second lens elements each having specific lens optical values, all of these lens elements having been surface-treated on the surfaces other than those which are to come in contact with each other when the first lens element and the second lens element are laminated later, to form thereon at least one layer selected from the group consisting of a tinted layer, a protective film layer and an anti-reflection film layer, (II) selecting from these lens elements one first lens element and one second lens element each having specific lens optical values, based on optical calculation, etc. so that these two lens elements can form a laminated ophthalmic lens of desired prescription, and (III) laminating the selected first lens element and the selected second lens element into an ophthalmic lens of desired prescription.

Japanese Utility Model Publication No. 250465/1985 discloses a process for producing a bifocal lens, which comprises separately forming a carrier lens composed of a diethylene glycol bis(allyl carbonate) resin and a segment composed of a copolymer of styrene and/or a styrene derivative and bisphenol A dimethacrylate and then laminating the carrier lens and the segment with an adhesive. However, this reference merely discloses a process for producing a composite lens by laminating the two lens elements with an adhesive, and it neither discloses nor suggests (a) providing a plurality of first and second lens elements each having specific lens optical values, all of these lens elements having been surface-treated and (b) selecting from these lens elements one first lens element and one second lens element each having specific lens optical values, based on optical calculation, etc., said (a) and (b) being essential features of the present invention.

The process of this reference aims at providing an ophthalmic lens with improved properties and cannot achieve merits in production such as quick delivery of the final product which is the greatest advantage of the present invention.

DETAILED DESCRIPTION OF THE INVENTION

A preferred embodiment of the process for producing an ophthalmic lens according to the present invention is explained referring to the accompanying drawings.

(I) STEP OF PROVIDING SURFACE-TREATED LENS ELEMENTS

(A) Formation of lens elements

First, the formation of the first lens element is described. Diethylene glycol bis(allyl carbonate) as a monomer for plastic lens and 2,2'-dihydroxy-4-methoxybenzophenone as an ultraviolet absorber are thoroughly mixed in a weight ratio of 99.85 (the former) / 0.15 (the latter) for 30 minutes to 1 hour with a propeller type stirrer. Then, thereto is added 3 parts by weight, based on 100 parts by weight of the above monomer, of diisopropyl peroxydicarbonate (IPP) as a polymerization initiator, and they are stirred for 30 minutes to obtain a mixture.

Figure 2A:
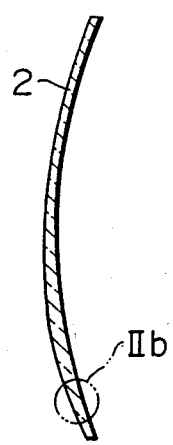
FIG. 2 (a and b) is a sectional view of the first lens element of the laminated lens of FIG. 1.

This mixture is poured into a mold for lens formation consisting of a glass mold and a resin gasket, and the mold is placed in an electric furnace to polymerize the mixture. The temperature program of polymerization is such that the temperature is slowly elevated form 40° C. to 85° C. in 20 hours and then kept at 85° C. for 1 hour. After the completion of the polymerization, the mold is taken out of the electric furnace, and the glass mold and the resin gasket are removed to obtain a first lens element 2 (refractive index $n_D = 1.499$) having a shape as shown in FIG. 2a. This first lens element 2 has a curvature radius, a center thickness, a diameter, etc. each of specific value (these values are referred to as lens optical values, in the present specification).

In a similar manner, various other first lens elements including the first lens elements 2a to 2f as shown in FIGS. 4 to 9 are formed. These first lens elements also have respective specific lens optical values.

The formation of second lens element is also effected by the cast polymerization similar to those employed in the above formation of first lens element, to obtain various second lens elements including the second lens elements 3 and 3a to 3f as shown in FIGS. 3a and 4 to 9. These second lens elements also have respective specific lens optical values.

The materials of the first and second lens elements can be a plastic but may also be a glass. When a glass is used as the materials of the first and second lens elements, the material glass is subjected to required treatments to obtain first and second lens elements each made of a glass and having specific lens optical values.

The combination of the first lens element and the second lens element can be a plastic lens and a plastic lens, a glass lens and a glass lens, or a plastic lens and a glass lens.

(B) Surface treatment of lens elements

Figure 3A:
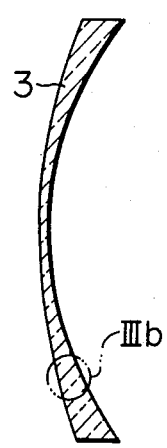
FIG. 3 (a and b) is a sectional view of the second lens element of the laminated lens of FIG. 1.

The first and second lens elements obtained in the above (A) are then surface-treated on their surfaces other than those which are to come in contact with each other when the first lens element and the second lens element are laminated later, to form thereon at least one layer selected from a tinted layer, a protective film layer and an anti-reflection film layer. Herein there is described a case of forming a tinted layer, a protective film layer and an anti-reflection film layer in this order on the first lens element 2 made of a plastic as shown in FIG. 2a and on the second lens element 3 also made of a plastic as shown in FIG. 3a.

(1) Formation of tinted layer

To one liter of water are added 5 g (0.5 weight %) of a disperse dye (color Index Disperse Orange) and 2 g (0.2 weight %) of a surfactant (HOYA STABILIZER which is a tinting stabilizer manufactured by HOYA CORPORATION) to prepare a tinting solution. In this tinting solution contained in a tank is immersed the first lens element 2 having its concave surface masked so as not to be tinted, at 90° C. for 30 minutes, to form a reddish brown tinted layer 5 (transmittance: 50%) at the convex surface (see FIG. 2b).

Figure 3B:
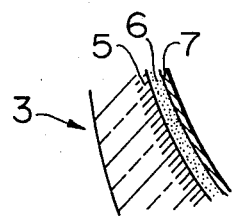
Figure 4:
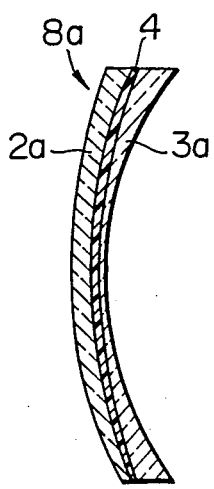
FIGS. 4 to 9 are sectional views of laminated lenses according to other embodiments of the present invention.
Figure 5:
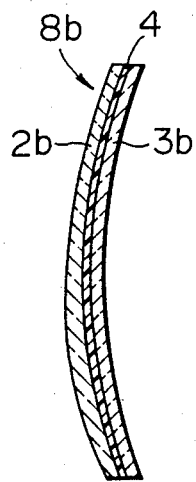
Figure 6:
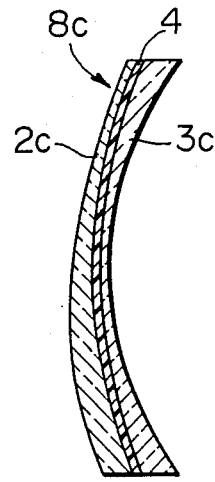

In a similar manner, a reddish brown tinted layer 5 is formed at the concave surface of the second lens element 3 (see FIG. 3b).

(2) Formation of protective film

A coating composition is prepared as follows which is to be coated on the above formed tinted layer to form a protective film layer thereon. That is, a mixture comprising 204 parts by weight of N-phenylaminopropyltrimethoxysilane, 297 parts by weight of γ-methacryloxypropyltrimethoxysilane, 100 parts by weight of water and 10 parts by weight of 0.1 N hydrochloric acid is stirred for 8 hours and then allowed to stand for 16 hours at room temperature to hydrolyze the two organosilicon compounds. To the resulting hydrolyzate solution are added 24 parts by weight of acetic acid, 120 parts by weight of butanol, 120 parts by weight of isopropyl alcohol, 16 parts by weight of aluminum acetylacetone, 0.2 part by weight of a silicone type surfactant and 0.1 part by weight of an ultraviolet absorber, and they are stirred for 8 hours and then aged for 24 hours at room temperature to obtain a coating composition.

Figure 2B:
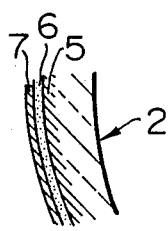

This coating composition is coated on the convex surface of the first lens element 2 having the concave surface masked, obtained in the above (1), and is heated at 60° C. for 30 minutes to form a protective film layer 6 on the tinted layer 5 of the first lens element 2 (see FIG. 2b).

In a similar manner, the above coating composition is coated on the concave surface of the second lens element 3 having the convex surface masked, obtained in the above (1), to form a protective film layer 6 on the tinted layer 5 of the second lens element 3 (see FIG. 3b).

(3) Formation of anti-reflection film layer

The first lens element 2 having the concave surface masked is placed in a vacuum tank. while the first lens element 2 is kept at 80° C., the tank is deaerated until it reaches a vacuum of $2 \times 10^{-5}$ TORR. Then, SiO mounted on a Mo heating element is rapidly vapor-deposited on the protective film layer 6 of the first lens element 2 at a rate of forming a film thickness of 130 mµ per minute to obtain a SiO vapor deposition layer of $\frac{1}{4}\lambda$ in thickness. Next, oxygen is introduced into the vacuum tank and the vacuum of the tank is lowered to $7 \times 10^{-5}$ Torr, after which SiO₂ is vapor-deposited on the SiO layer at a rate of forming a film thickness of 30 mµ per minute to obtain a SiO₂ vapor deposition layer of $\frac{1}{4}\lambda$ in thickness.

The SiO vapor deposition layer and the SiO₂ vapor deposition layer both formed on the protective film layer 6 constitutes an anti-reflection film layer 7 (see FIG. 2b). This anti-reflection film layer 7 consisting of the SiO layer of high refractive index and the SiO₂ layer of low refractive index possesses a function of reflection prevention.

In a similar manner, an anti-reflection film layer 7 (see FIG. 3b) is formed on the protective film layer 6 of the second lens element 3 having the convex surface masked.

In the above, there has been explained a case of forming a tinted layer, a protective film layer and an anti-reflection film layer on plastic lens elements. In the present invention, it is not necessary to form all of these three layers, and at least one layer selected from them is sufficient in some cases. Therefore, in the practice of the present invention, a variety of the first and second lens elements including 2, 2a to 2f, 3 and 3a to 3f as shown in FIGS. 1 to 9 are surface-treated to obtain various first and second lens elements each having at least one layer selected from a tinted layer, a protective film layer and an anti-reflection film layer.

The surface-treated first and second lens elements thus obtained are kept in stock until their use. These surface-treated lens elements are superior in weather resistance, moisture resistance, etc. and accordingly, undergo no deterioration by light, heat, moisture, etc. during storage. It is preferable that the types of the first and second lens elements to be kept in stock be as many as possible in view of such factors as lens item (material, refractive index), lens focus (single vision, bifocal, trifocal, progressive) and lens optical values (radius of curvature, center thickness, diameter). As for the second lens elements, it is preferable that the convex surface (the surface which is to contact with the concave surface of the first lens element) be spherical, the concave surface be spherical or toric and the focus be single vision.

(II) STEP OF SELECTING A PAIR OF LENS ELEMENTS

When a lens order is received with its prescription, a first lens element and a second lens element are selected based on the prescription.

For instance, when an order is received for a lens whose prescription is as follows,
 diameter: 65 mm
 spherical power (S): −6.00 D
 cylindrical power (C): −1.00 D
 cylindrical axis (AX): 90°
 focus: single vision
 with a tinted layer, a protective film layer and an anti-reflection film layer
as a first step, there are selected lens items each having a tinted layer, a protective film layer and an anti-reflection film layer, as first and second lens elements. Then as a second step, S, C, AX, etc. are determined for each of the first and second lens elements based on optical calculation. That is, since the first lens element ($L_1$) and the second lens ($L_2$) are laminated later so as to have a common optical axis, the back focal length F of the resulting laminated lens is given by the following formula:

$$\frac{1}{F} = \frac{1}{f_1} + \frac{1}{f_2}$$

(in the above formula, $f_1$ and $f_2$ are the back focal lengths of $L_1$ and $L_2$, respectively). Also, the refracting power D of the laminated lens is given by the following formula:

$$D = D_1 + D_2$$

(in the above formula, $D_1$ and $D_2$ are the refracting powers of $L_1$ and $L_2$, respectively), Therefore, when the prescription is determined and one of $L_1$ and $L_2$ is determined, the other lens can be determined. For instance, when $L_1$ has a diameter of 65 mm, a spherical power (S) of −4.00 D and a cylindrical power (C) of 0.00 D, there can be selected, as $L_2$, a lens having a diameter of 65 mm, a spherical power (S) of −2.00 D [(−6.00−(−4.00)], a cylindrical power (C) of −1.00 D [(−1.00) (0.00)] and a cylindrical axis (AX) of 90°.

Also, when an order is received for a progressive lens whose prescription is diameter=65 mm, spherical power (S)=−3.00 D. cylindrical power (C)=−1.00 D, cylindrical axis (AX) =30°, addition power (ADD)=+1.00 D and prism 0.50△ down and if there is selected, as the first lens element, a lens element 2 as shown in FIG. 2a having a diameter of 65 mm, a center thickness of 1 mm, a spherical power (S) of −0.50 D, a cylindrical power (C) of 0.00 D, an addition power (ADD) of +1.00 D, prism 0.50△ down and a convex surface consisting of an aspheric with a progressive zone, there can be selected, as the second lens element, a lens element 3 as shown in FIG. 3a having a diameter of 65 mm, a center thickness of 1 mm, a spherical power of −2.50 D, a cylindrical power (C) of −1.00 D, a cylindrical axis (AX) of 30° and a single vision.

(III) STEP OF LAMINATING SELECTED LENS ELEMENTS

Then, the selected first and second lens elements are laminated with each other to obtain a final ophthalmic lens product.

The lamination is preferably effected by coating an adhesive on the concave surface of the first lens element 2 and on the convex surface of the second lens element 3 and then laminating the two coated surfaces.

As the adhesive, there can be used photosetting resins and thermosetting resins. As the photosetting resins, there can be used, for example, mixtures of an oligomer (e.g. acrylic type, unsaturated polyester type, butadiene type, urethane type), a functional group-containing monomer such as 2-hydroxyethyl methacrylate or the like and a photo-reaction initiator such as benzophenone or the like. (As the commercially available products of such mixtures, there are Norland No. A65, ARONIX 30033, Photobond 100, Hardlock OP-1000, etc.) As the thermosetting resins, there can be used, for example, those of epoxy type, acrylic type, etc.

Figure 1:
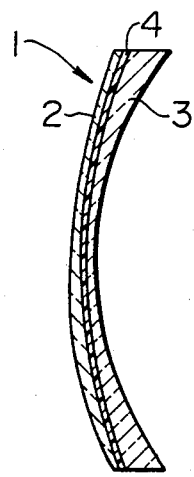
FIG. 1 shows a sectional view of a laminated lens according to an embodiment of the present invention.
Figure 7:
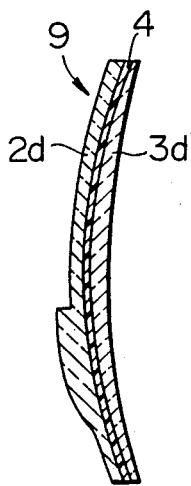
Figure 8:
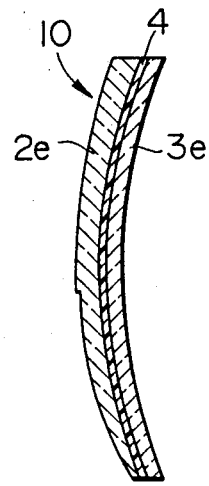
Figure 9:
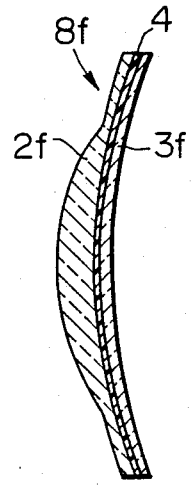

The typical examples of the laminated lenses obtained according to the present invention are shown in FIGS. 1 and 4 to 9. A lens 1 of FIG. 1 is a progressive lens; lenses 8a, 8b, 8c and 8f of FIGS. 4, 5, 6 and 9, respectively, are each a single vision lens; a lens 9 of FIG. 7 is a bifocal lens; and a lens 10 of FIG. 8 is a one-piece bifocal type (EX type) lens.

The process for producing an ophthalmic lens according to the present invention has an advantage that an ophthalmic lens meeting a given prescription can be delivered to a customer in a short period of time after order receiving, because the first lens element and the second lens element are kept in stock in a state that their final processings including surface treatments are complete, and a final ophthalmic lens product can be obtained by simply laminating them upon receipt of order.

The present process has a further advantage that the first and second lens elements undergo no detrioration during storage, because they are kept in storage in a state that their final processings including surface treatments are complete.

The present process has a still further advantage that various types of final products can be obtained by keeping a great variety of first lens element and a great variety of second lens elements in stock.

What is claimed is:

1. A process for producing an ophthalmic lens which is a laminate of a first lens element and a second lens element, which process comprises the sequential steps of:

(I) providing a plurality of first and second lens elements, each of said first and second lens elements having predetermined lens optical values and anterior and posterior surfaces, wherein only said anterior surfaces of said first lens elements and said posterior surfaces of said second lens elements have been surface-treated to form thereon at least one layer selected from a tinted layer, a protective film layer and an anti-reflection film layer, whereby said posterior surfaces of said first lens elements and said anterior surfaces of said second lens elements are untreated;

(II) selecting one of said first lens elements and one of said second lens elements on the basis of an ophthalmic prescription so that said selected first and second lens elements collectively provide a desire dophthalmic correction according to said prescription when said selected first and second lens elements are laminated one to another; and (III) laminating said selected first and second lens elements one to another by overlaying said untreated posterior surface of said selected first lens element onto said untreated anterior surface of said selected second lens element, and adhesively bonding said untreated posterior and anterior surfaces of said first and second lens elements, respectively, one to another, thereby to form a laminated ophthalmic lens of said desired prescription.

2. A process according to claim 1, wherein the first lens element and the second lens element are each made of a plastic.

3. A process according to claim 1 or 2, wherein the opthalmic lens produced is selected from the group consisting of a single vision lens, a bifocal lens, a progressive lens and a one-piece bifocal (EX) type lens.

* * * * *